UNITED STATES PATENT OFFICE.

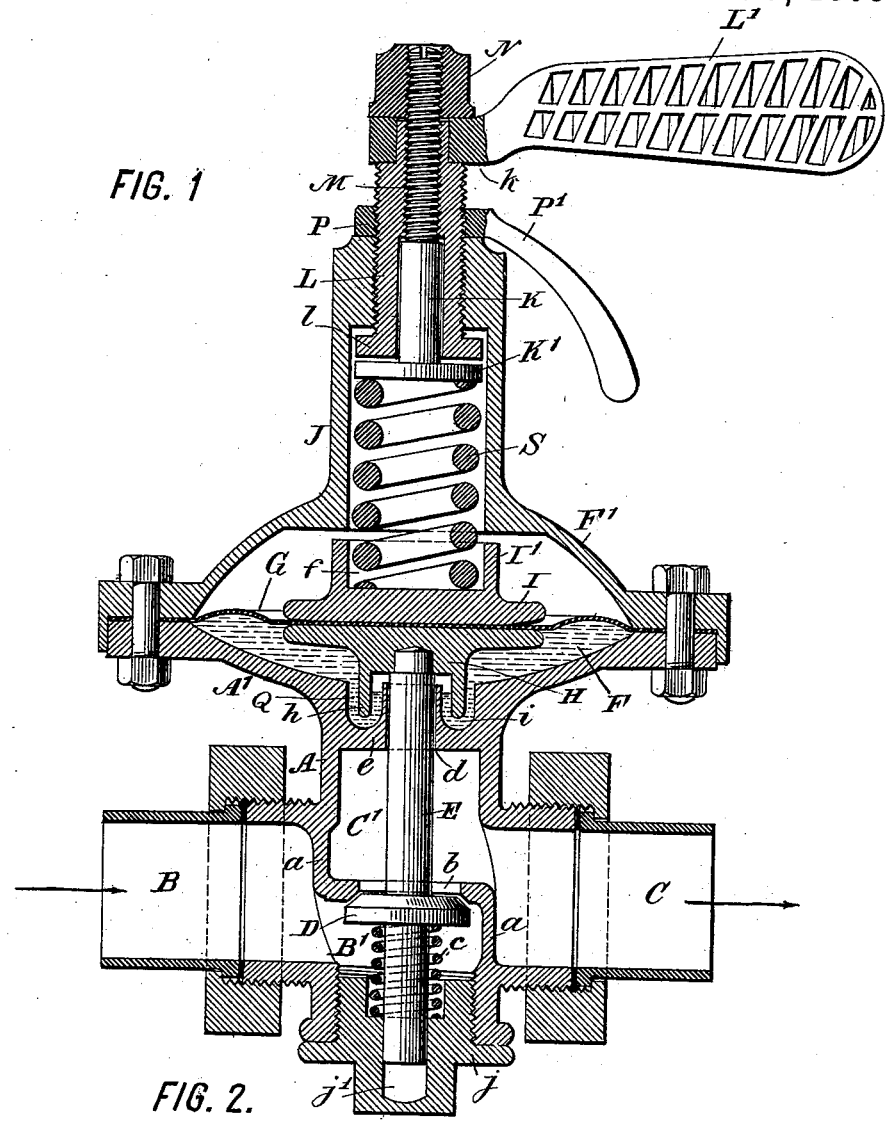

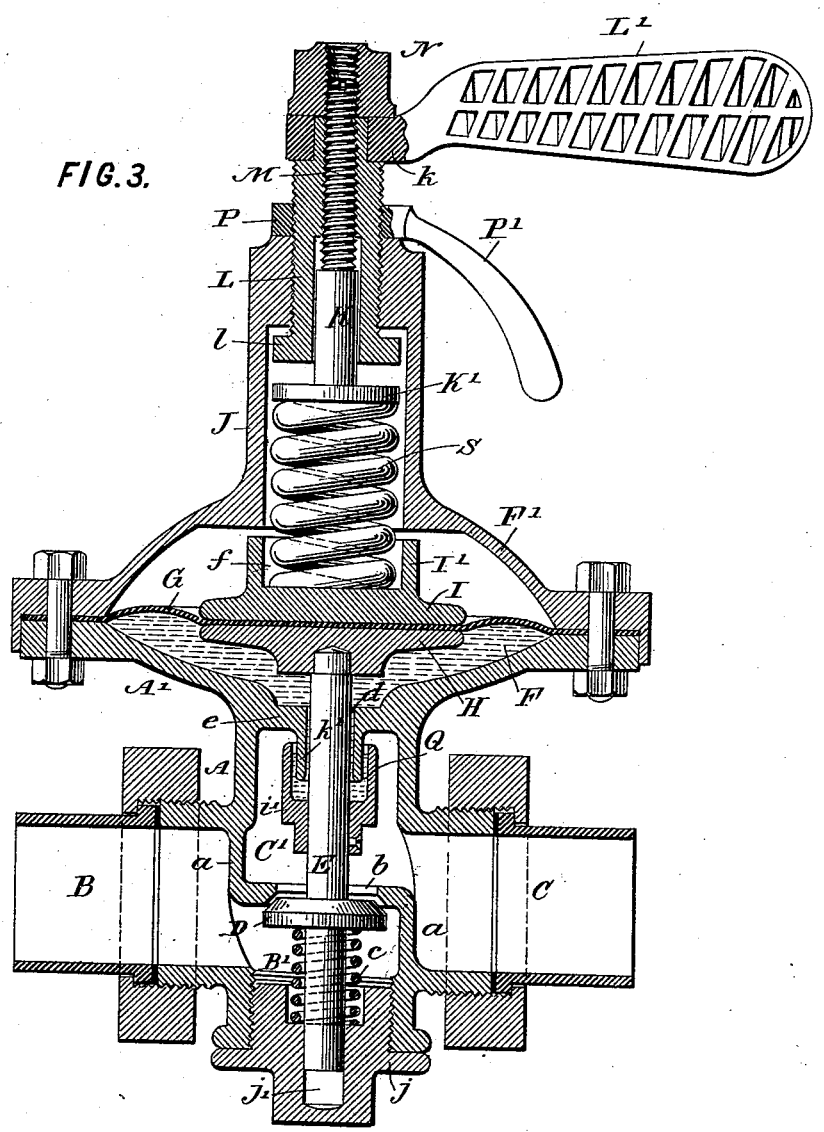

EDWARD E. GOLD, OF NEW YORK, N. Y.

PRESSURE-REGULATOR.

SPECIFICATION forming part of Letters Patent No. 508,135, dated November 7, 1893.

Application filed April 10, 1893. Serial No. 469,667. (No model.)

*To all whom it may concern:*

Be it known that I, EDWARD E. GOLD, a citizen of the United States, residing in the city, county, and State of New York, have invented certain new and useful Improvements in Pressure-Regulators, of which the following is a specification.

This invention relates to regulators for reducing the fluid from a higher to a lower pressure, and especially to such regulators wherein the valve controlling the flow is moved directly or indirectly by a diaphragm which receives on one side the reduced pressure from the eduction side of the valve, and on the other side the pressure of a spring the tension of which determines the pressure existing on the eduction side of the valve, this tension being varied by the adjustment of a screw spindle in order to control at will the reduced pressure determined by the regulator.

As applied to such regulators my invention provides certain practical improvements the nature of which will be hereinafter fully set forth.

Figure 1 of the accompanying drawings is a vertical mid-section of my improved regulator. Fig. 2 is a fragmentary plan thereof, the upper set-nut being removed. Fig. 3 is a vertical section of a modification.

Let A designate the valve casing, B the induction pipe, and C the eduction pipe. Within the valve casing is a partition $a$ dividing it into induction and eduction chambers B' and C', and in this partition is formed a valve seat $b$ against which closes the regulating valve D, which is mounted on a valve-stem E and receives the upward pressure of a spring $c$ tending to close it.

The valve casing A is formed with a diaphragm chamber F consisting of two halves or shells A' and F' bolted together at their margins and clamping between them the diaphragm G, which may be made of sheet metal or other suitable flexible material. The chamber F communicates with the eduction chamber C' by means of a restricted opening $d$ through a partition $e$, this opening being very slightly larger than the diameter of the stem E which passes through it, so that a slight leak is left around the stem for the passage of steam between the eduction chamber and the diaphragm chamber. On the top of the stem E is mounted a disk or head H, which is held pressed against the under side of the diaphragm by the tension of the spring $c$. On the upper side of the diaphragm is a similar disk or head I, which is formed with a tubular upward extension I' forming within it a socket $f$, and in this socket the lower end of the regulating spring S is seated. This spring extends up within a chamber J, and its upper end presses against the enlarged head K' of a plunger K. The upper end of the chamber J has a screw-threaded opening through which passes a screw spindle L, the threads of which screw up or down in the opening when the spindle is turned by its handle L'. Within the spindle L, which is made tubular, is an adjusting screw M whose threads engage internal threads in the spindle, and whose lower end receives the upward thrust of the plunger K. When the screw spindle L is adjusted up or down by turning the handle L', it is clamped in position by a lock-nut P, which is provided with a handle P' for convenience in turning it. The spring $c$ reacts downwardly against a screw-cap $j$ in which is formed a socket $j'$ serving as a guide for the lower end of the stem E, the upper part of which is guided in the hole $d$. By unscrewing the cap $j$ the spring $c$, stem E, and valve D may be taken out, since the opening into which the cap screws is larger in diameter than the valve, and since the valve stem E is only loosely connected or socketed in the hub of the disk H.

The induction pipe B being connected to a steam boiler or other reservoir of fluid under pressure, and the eduction pipe C being connected to a point at which it is desired to use the fluid at a lower pressure, the regulator serves to choke back the flow of fluid sufficiently to reduce its pressure to the required extent. The spring S being adjusted to the proper tension to accomplish this result, exerts a downward pressure upon the disk I, and consequently upon the diaphragm G, which pressure is communicated through the disk H and stem E to the valve D, and serves to press the valve open whenever the pressure on the eduction side of the valve falls below that pressure to which the regulator is set. As the valve is opened and steam passes through it and increases the pressure in the eduction chamber, steam flows from the latter through the space $d$ into the diaphragm chamber F, and exerts an upward pressure upon the diaphragm until this upward pressure is sufficient to overcome the tension of the spring and press the diaphragm upwardly, whereupon the spring $c$ will press the valve D upward against or nearer to its seat, thereby choking back the steam and correspondingly reducing the pressure. As the pressure on the eduction side of the valve falls, the spring again presses down the diaphragm and opens the valve, so that by a balancing of the downward pressure of the spring and the upward pressure of the steam, the regulator is caused to admit steam through the valve with just sufficient rapidity to keep up the pressure beyond it to that which is required.

In the use of the regulator the pressure on the eduction side is determined by turning the handle L′ to right or left and thereby screwing the spindle L up or down, whereby the tension of the spring S is increased or diminished. To increase the pressure, the spindle is screwed down to increase the tension of the spring S, and vice versa. The maximum pressure is limited by the under side $k$ of the boss of the handle L′ striking the upper side of the nut P, thereby constituting a downward stop. In order to limit the maximum pressure which may exist on the eduction side of the regulator, the initial tension of the spring S is determined by a preliminary adjustment of the screw M. To this end the spindle L is screwed down as far as it will go, that is, until the shoulder $k$ strikes the jam-nut P or other obstruction in its path, whereupon the screw M is turned out or in until the desired maximum limit of pressure is reached, as shown by a gage to be connected with the pipe or passage on the eduction side of the regulator. Any subsequent movement of the handle L′ will then vary the regulator to give pressures within or below the limit thus fixed. By means of this construction it is impossible for the person using the valve to turn on a higher pressure than the maximum pressure consistent with safety which shall have been predetermined by the initial adjustment of the screw M.

As thus far described the construction is identical with that shown in my application for patent for pressure regulator filed February 8, 1892, Serial No. 420,799. I will now describe the improvements which characterize my present invention.

In my former construction the adjusting screw M was a concealed screw, being inclosed beneath a cap. This for some purposes is desirable, particularly where the person using the regulator is not to be permitted to tamper with its adjustment. According to my present invention, however, the screw M is in full view, and serves in addition to its function as an adjusting screw, the purpose of contributing to the attachment of the handle L′ to the screw spindle L. The handle L′ has a square, hexagonal or other polygonal socket which fits over the correspondingly shaped upper end of the spindle L, while the screw M projects considerably above the top thereof to a distance dependent of course upon the adjustment of the screw for determining the initial tension of the spring S. Over the upwardly projecting end of the screw M is screwed a nut or cap N having internal threads engaging external threads on the screw M, and which when screwed down to its place seats against the upper surface of the socket portion of the handle L′, so that this nut on being tightened serves to hold the handle down firmly in place on the screw spindle. At the same time the nut N serves to lock the screw M firmly in place and prevent any possibility of the adjustment being accidentally altered by reason of the turning of the screw spindle L which carries the screw M, so that the end of the latter rotates relatively to the plunger K, which normally remains stationary by reason of its contact with the spring S. This relative rotation tends to turn the screw M relatively to the spindle L and thereby to screw it up or down as the case may be, and consequently to effect the adjustment of the maximum limit of pressure. To prevent this possibility my former construction provided for locking the adjusting screw M in place by a key engaging the spindle L, but according to my present invention I impose upon the nut the double function of locking fast the screw M, and of tightly clamping the handle L′ in place on the screw spindle.

Another feature of my present invention is the provision of a water seal Q between the diaphragm chamber F and the eduction chamber C′ for the purpose of preventing the "chattering" of the regulator valve. It is well known that in diaphragm valves there is a liability to rapid vibration or seating and unseating of the valve, due as is believed to the opening of the valve admitting the steam pressure against the diaphragm which presses it up to close the valve, whereupon by the escape of this pressure the diaphragm is forced down by the spring, thereby opening the valve and admitting another influx of steam, and causing a repetition of the former effect, the opening and closing movements of the valve thus following in rapid succession. My present invention entirely obviates this difficulty by cutting off the diaphragm chamber from direct communication with the steam or other fluid admitted past the valve, while preserving sufficient indirect communication to retain the diaphragm under proper control of the steam on the eduction side of the regulator. To this end I preferably construct the disk H with a downwardly projecting annular flange $h$, which enters an annular groove or trough $i$ formed in the upper side of the partition $e$, which is interposed between the diaphragm chamber F and the eduction chamber C′. The flange $h$ projects sufficiently down into the groove to form a water seal, which in use is quickly filled with water by condensation of the steam which passes up the passage $d$ into the chamber F, and which as it condenses runs back down the inclined lower side of this chamber and collects in the groove $i$. In course of time it is believed that the condensation will entirely fill the chamber F with condensed water to the effect shown in the drawings. This result is believed to be due to the fact that as the steam which first fills the chamber F condenses, its place is taken by more steam ascending into the chamber, while the condensation water collecting in the seal Q, in connection with the pressure in the chamber C′ beneath, prevents the running out of the condensed water that accumulates, and steam continues to ascend to take the place of that which is contracted by condensation, until eventually the chamber F becomes filled with water. The result is that a fluid brake is applied to the under side of the diaphragm to impede any sudden movements thereof, so that the movements of the diaphragm are reduced to comparatively slow or gradual movements, sufficiently rapid however for all practical purposes in maintaining a uniform pressure on the eduction side of the regulator. The pressure of steam in the chamber C′ consequently acts upwardly through the passage $d$ upon the water on the inner side of the annular flange $h$, pressing downwardly thereupon, and this pressure is communicated through the body of water, so that an equal upward pressure is imparted to the diaphragm. This construction has been demonstrated by extended practical use to effectually prevent all chattering of the regulator valve, a difficulty which prior to the adoption of this improvement had proved highly objectionable and annoying because of the noise produced, and the injury to the valve seat and the diaphragm resulting from the rapid vibration or pounding.

My invention is to be distinguished from a construction wherein the diaphragm is located beneath the valve, in a pocket or chamber which becomes filled with water on both sides of the diaphragm, and which has no water seal or trap, or circuitous passage, between the diaphragm chamber and valve. In such a construction if the regulator is disused in cold weather it is liable to be damaged by the freezing of the imprisoned water, whereas with my construction if freezing occur the diaphragm will be simply deflected upwardly, compressing the spring, and doing no harm.

In my improved pressure regulator when employed for use with gases or vapors which are not condensable, as compressed air for example, I propose to make the liquid seal Q somewhat deeper as may be necessary, and fill it with an initial charge of water, oil, glycerine, or other suitable liquid. When the regulator is used for regulating water pressure, the friction of the water column involved in its circuitous flow through the seal Q, serves the same purpose as when the regulator is used with steam and the seal is filled with condensed water, as already described.

The liquid seal Q may be constructed in several different ways, its precise construction not being essential. In Fig. 3 is shown a modification wherein the seal is constructed by a cup $i'$ fastened to and carried by the valve stem E and entered by a downwardly projecting flange $h'$ formed integrally with the dividing partition $e$. The cup $i'$ is small enough to pass through the valve-seat $b$ in order to permit the taking out of the valve when the lower cap $j$ is removed. In this construction of seal it is the annular channel carrying the liquid that moves up and down with the diaphragm, whereas in the former construction it is the annular pendent flange $h$ that is movable.

I claim as my invention the following-defined novel features or improvements, substantially as hereinbefore specified, namely:

1. In a pressure regulator wherein the pressure is determined by the tension of a spring S pressing against a diaphragm G for controlling the opening of a valve, and the tension of said spring is varied at will by turning a screw spindle L, the combination therewith of an adjusting screw M which receives the pressure of said spring and communicates it to said spindle, the said screw screwing into said spindle and projecting above the top thereof, and a nut N screwing on said screw M and tightening against the top of said spindle for locking said screw to the spindle to prevent its turning therein and impairing the adjustment.

2. In a pressure regulator wherein the pressure is determined by the tension of a spring S pressing against a diaphragm G for controlling the opening of a valve, and the tension of said spring is varied at will by turning a screw spindle L having a handle L′ fitted on its upper end, the combination therewith of an adjusting screw M which receives the pressure of said spring and communicates it to said spindle, the said screw screwing into said spindle and projecting above the top thereof, and a nut N screwing on the projecting portion of said screw and bearing down against said handle L′, whereby it locks the screw M fast in the spindle and locks the handle L′ fast to the spindle.

3. In a pressure regulator wherein the pressure is determined by a diaphragm acting upon the valve, said diaphragm arranged above the valve and receiving on one side a regulating tension and having on the other side a chamber communicating with the eduction side of the valve, the combination therewith as a means for preventing chattering, of a liquid seal beneath the diaphragm chamber and between it and the chamber or passage on the eduction side of the valve.

4. In a pressure regulator wherein the pressure is determined by a diaphragm acting upon the valve, said diaphragm arranged above the valve and receiving on one side a regulating tension and having on the other side a chamber communicating with the eduction side of the valve, the combination therewith as a means for preventing chattering, of a liquid seal Q beneath the diaphragm chamber and between it and the chamber or passage on the eduction side of the valve, consisting of two parts the one stationary and the other movable with the diaphragm, the one part being a downwardly projecting annular flange and the other part formed with the annular channel entered by said flange and adapted to hold liquid.

5. The combination to form a pressure regulator of a shell A, divided by a partition $a$, having a valve-seat $b$, into eduction and induction chambers, and formed with a portion A' for inclosing the diaphragm chamber F, and with an intervening partition $e$ having an opening $d$ through it for the passage of a valve stem, and an annular channel $i$ around said opening, a valve D and its stem E, the latter passing up through said opening into said diaphragm chamber, a diaphragm G having an annular flange $h$ projecting downwardly into said channel $i$ to form the liquid seal Q, and a spring S pressing on the opposite side and tending to open the valve.

In witness whereof I have hereunto signed my name in the presence of two subscribing witnesses.

EDWARD E. GOLD.

Witnesses:
GEORGE H. FRASER,
ARTHUR C. FRASER.